July 20, 1926.
D. W. BRUNTON
1,593,429
POCKET TRANSIT
Filed June 21, 1924
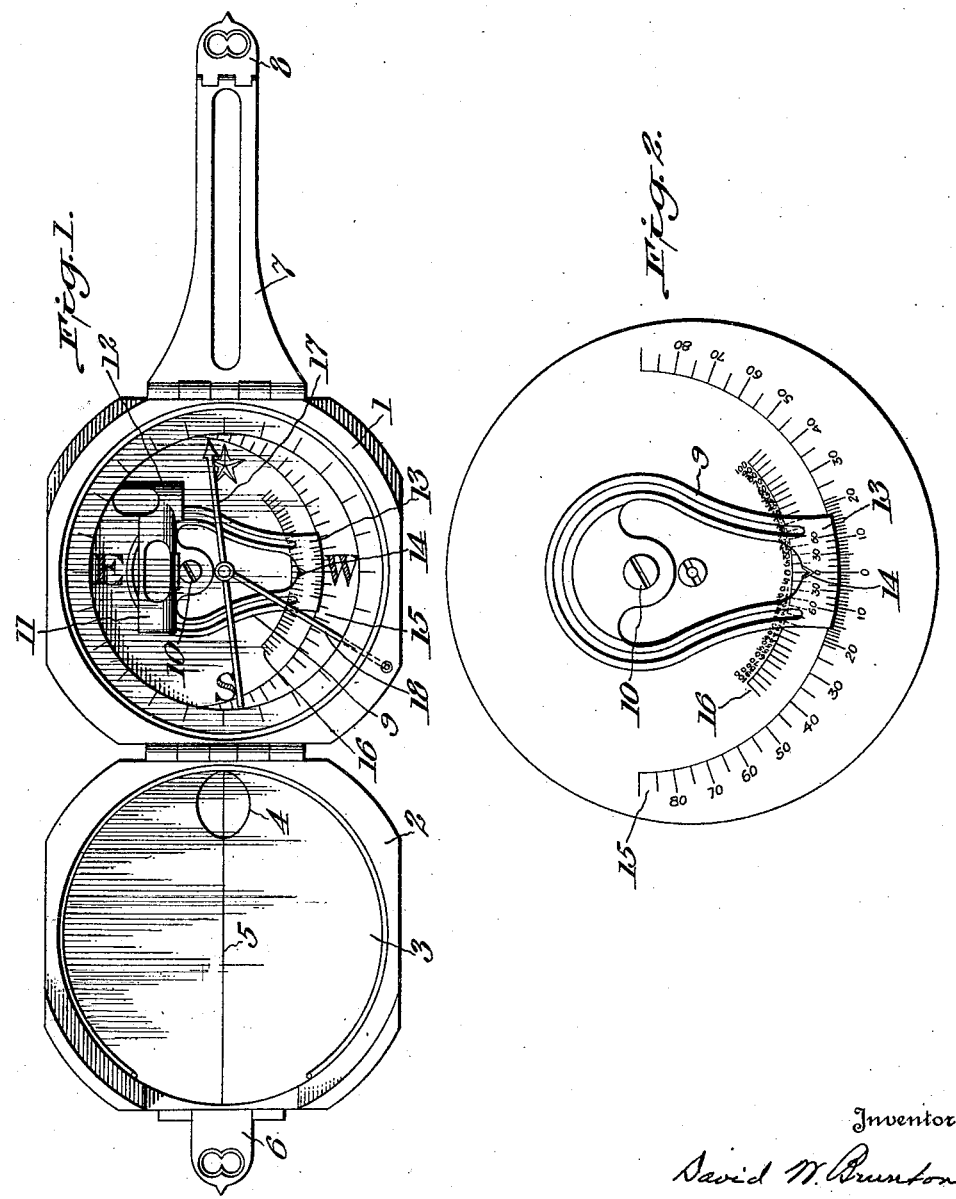
Inventor
David W. Brunton
by W. N. Finckel
Attorney Patented July 20, 1926.

1,593,429

UNITED STATES PATENT OFFICE.

DAVID W. BRUNTON, OF DENVER, COLORADO.

POCKET TRANSIT.

Application filed June 21, 1924. Serial No. 721,594.

This invention relates more especially to a surveying compass or pocket transit of the type known as the Brunton transit, and illustrated in my Patents No. 526,021, dated September 18, 1894, No. 1,042,079, dated October 22, 1912, No. 1,062,582, dated May 27, 1913, No. 1,092,822, dated April 14, 1914, and No. 1,339,019, dated May 4, 1920.

The main object of the present invention is to increase the range of use of the instrument by the addition to the scales already employed of another scale by means of which the percent of grade or slope may be readily ascertained without calculation.

The invention consists in a transit of the character described having a vertical scale by means of which vertical angles may be measured and in addition another scale by means of which the percent of grade or slope may be ascertained at the same time, the vernier and its arm being constructed so as to adapt it for use with both of these scales, as I will proceed now to explain and finally claim.

In the accompanying drawings illustrating the invention, in the several figures of which like parts are similarly designated, Figure 1 is a plan view of the instrument open. Fig. 2 is an enlarged detail of the base or plate containing the two vertical angle scales and the vernier and vernier arm of the present invention.

The body of the instrument may comprise a casing 1, having hinged thereto a cover 2, provided with an inside mirror 3, an opening 4, a center line 5, and a folding sight 6. The body of the instrument has applied to it the folding sight arm 7, at the end of which is a folding sight 8.

The vernier arm 9 is pivotally mounted at 10 on the body and may be provided with the bubble tubes 11 and 12. At the opposite end of this vernier arm is provided a vernier 13, the vernier arm being so constructed as to provide a zero indicator, such as a notch 14.

The outer edge of the vernier is arranged to read in connection with the ordinary vertical angle scale 15, while the notch or zero indicator 14 is arranged to read with the newly-applied slope scale 16, so that as the observer uses the instrument the reflection in the mirror enables him to read not only the vertical angle but also and at the same time the percent of slope, and thus the instrument is especially adapted for the use of engineers in building roads, laying pipe lines, and getting the slope of land surfaces, thus increasing the utility of the instrument and adapting it for a wide range of engineering work.

The vertical angle scale 15 is graduated in degrees, while the slope scale 16 is graduated to indicate percent of slope.

17 is a magnetic needle and 18 is a locking lever therefor.

The use of the slope scale enables the engineer to read the percent of slope direct instead of having to calculate it in the number of degrees of the vertical angle.

Variations in the details of construction and arrangement of parts are permissible within the principle of the invention and the scope of the claim following.

What I claim is:—

In a surveying compass having a mirrored cover of the type known as the Brunton transit, a casing provided with a double scale for reading vertical angles one of the scales being graduated to degrees and the other to percent of slope, and a pivoted vernier arm provided with a leveling bubble and having a vernier provided with an edge graduated to read in connection with the degree scale and another edge having a zero indicator to read in connection with the percent of slope scale.

In testimony whereof I have hereunto set my hand this 17th day of June A. D. 1924.

DAVID W. BRUNTON.